A. LOOMIS.
WIND SHIELD FOR MOTOR VEHICLES.
APPLICATION FILED OCT. 15, 1907
1,012,670.
Patented Dec. 26, 1911.
2 SHEETS—SHEET 1.
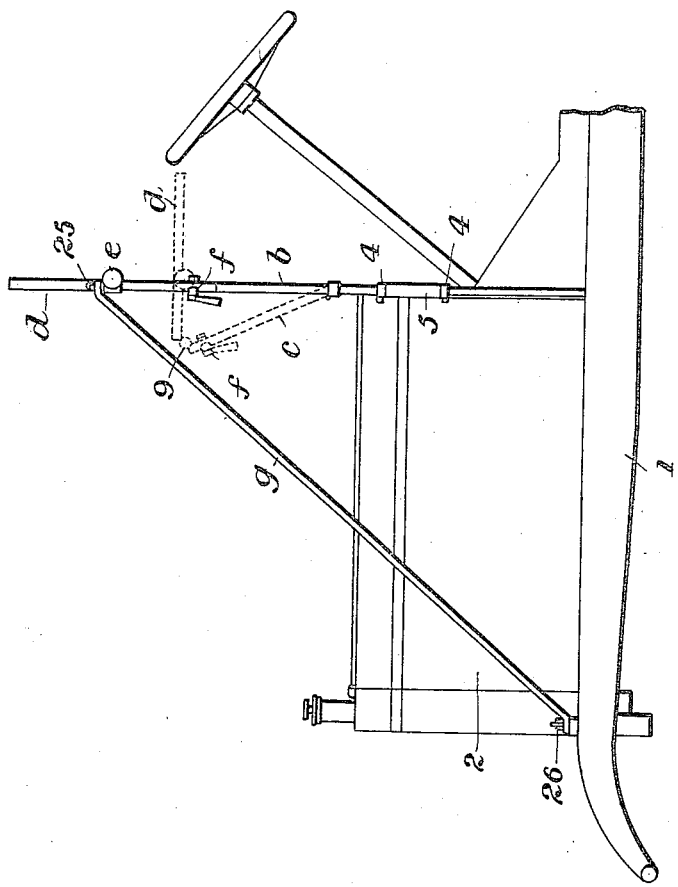
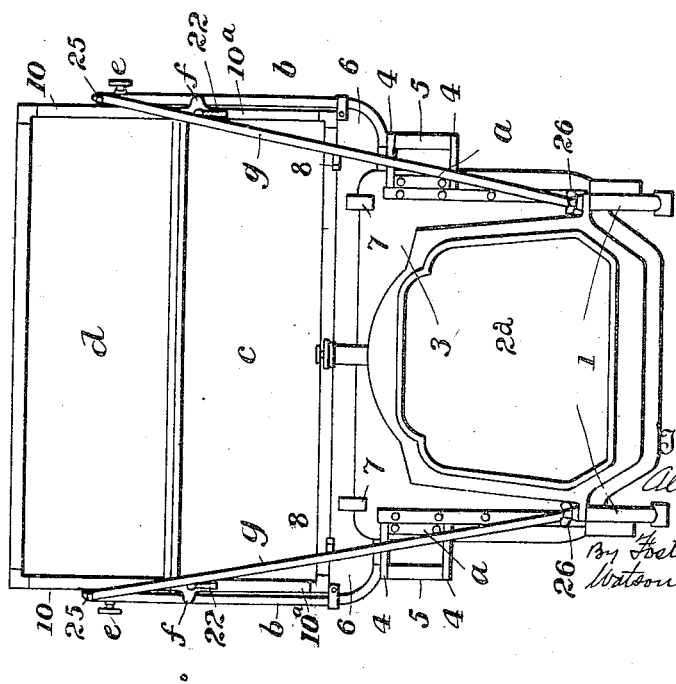
Witnesses
J. G. Stinkel
J. J. McCarthy
Inventor
Allen Loomis
By Foster Freeman
Watson & Coit
Attorneys A. LOOMIS.
WIND SHIELD FOR MOTOR VEHICLES.
APPLICATION FILED OCT. 15, 1907.
1,012,670.
Patented Dec. 26, 1911.
2 SHEETS—SHEET 2.
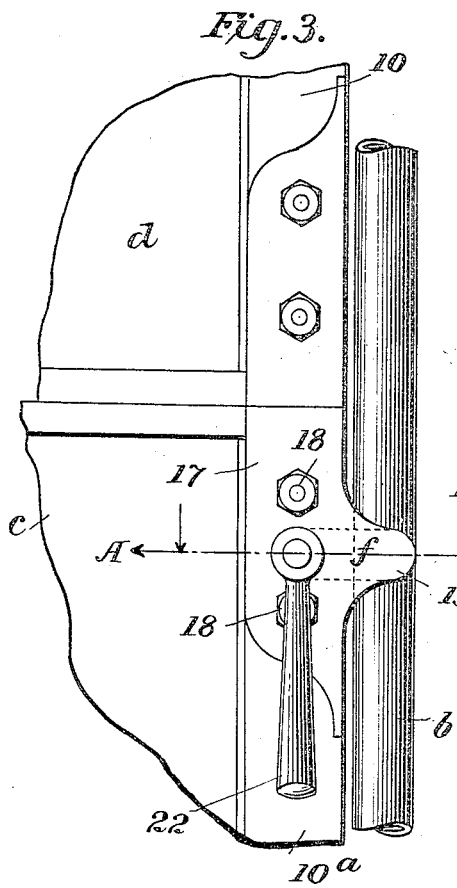
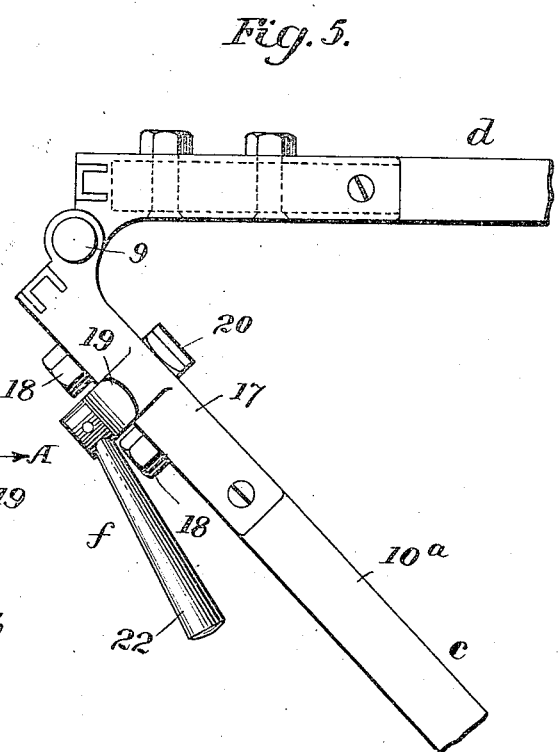
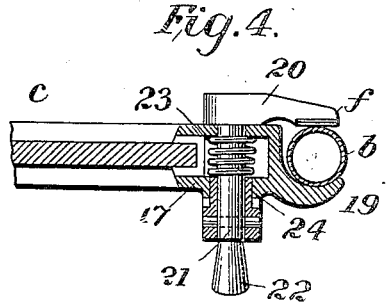
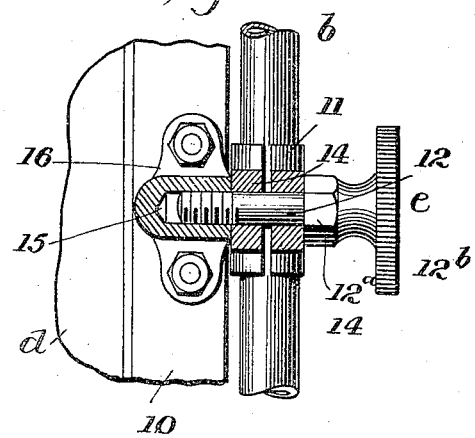
Witnesses
J. G. Hinkel
J. J. McCarthy
Inventor
Allen Loomis
By Foster Freeman Watson & ...
Attorneys

UNITED STATES PATENT OFFICE.

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

WIND-SHIELD FOR MOTOR-VEHICLES.

1,012,670.　　　　　Specification of Letters Patent.　　Patented Dec. 26, 1911.

Application filed October 15, 1907.　Serial No. 397,573.

*To all whom it may concern:*

Be it known that I, ALLEN LOOMIS, a citizen of the United States, and resident of Detroit, Wayne county, State of Michigan, have invented certain new and useful Improvements in Wind-Shields for Motor-Vehicles, of which the following is a specification.

This invention comprises improvements in wind shields for automobiles, the details and advantages of which will be pointed out in the following specification, taken in connection with the accompanying drawing, in which, Figure 1 is a front elevation of the wind shield and part of an automobile; Fig. 2 is a side elevation of the same; Fig. 3 is a front view of portions of the upper and lower panels of the shield, and one of the guide rods, showing one of the clamps for securing the lower panel to the guide rods; Fig. 4 is a section on the line A—A of Fig. 3; Fig. 5 is a side view of two adjacent portions of the upper and lower panels, and Fig. 6 is a detail view, showing one of the adjustable connections between the upper panel and the guide rods.

Referring to the drawing, 1 indicates an automobile frame 2 the engine hood, $2^a$ the radiator and 3 the dash board of the vehicle. Upon the ends of the dash board are secured a pair of brackets $a$, each having a pair of outwardly projecting arms 4 which are provided with alined openings adapted to receive the lower end portions 5 of metal guide posts or rods $b$ of the wind shield. These guide posts are connected, immediately above the parts 5, by a plate or sill 6 which is adapted to rest upon the top of the dash board 3 when the lower end portions of the guide rods are in position in the brackets. Suitable clips 7 may be arranged upon the sill so that they will extend down vertically over the edges of the dash board and prevent vibratory movement of the sill. The wind shield comprises two panels $c$ and $d$, the former of which is secured to the upper edge of the sill by hinges 8 which permit said panel to swing forward, as indicated in dotted lines in Fig. 2. The lower edge of the upper panel is connected to the upper edge of the lower panel by hinges 9 which permit the upper panel to fold backwardly with reference to the lower panel, as indicated in dotted lines in Fig. 2. At some distance from the lower edge of the upper panel, the side bars 10 of its frame are swiveled to clamping devices $e$ which are adjustable vertically upon the guide rods. One of these adjustable swivel connections is shown in detail in Fig. 6, and it consists of a split clamping sleeve 11 encircling the rod $b$, a clamping screw 12 extends through alined openings in lugs 14 adjacent to the kerf in the sleeve, and into a socket 15 in a fitting 16 which is secured to the side bar 10 of the panel. The threaded end of the screw engages threads in the socket, and it will be seen that by tightening the screw, the lugs 14 on the sleeve will be gripped between the shoulder $12^a$ on the screw and the fitting 16, so that the sleeve will be clamped to the guide rods, and by loosening the screw the sleeve may be adjusted up and down upon the rod. When the sleeve is moved the panel will turn pivotally on the clamping screw. These screws are provided with large milled heads $12^b$, so that they may be conveniently turned by hand.

In Figs. 1 and 2 the two panels are shown in their upright positions in full lines. It will be evident from an inspection of Fig. 2, that when the clamps $e$ are moved downward on the guide rods, as shown in dotted lines, the lower panel $c$ will swing forwardly until the upper panel reaches the horizontal position, and with a continued downward movement of the clamps the lower panel will swing back into its upright position and the upper panel will fold against the rear side of the lower panel.

By the arrangement thus far described, certain difficulties which arise in the construction of practical folding wind shields are overcome. On an automobile the dash board lights, at the forward side of the shield, and the steering wheel at the rear side, constitute obstructions which it is difficult to clear with a folding shield without cutting away portions of the shield. By my improvements, it will be evident that the panels of the shield may be made of any desired width and that in folding or unfolding the shield it will not engage either the lamps or the steering wheel.

Upon the upper ends of the side bars $10^a$ of the lower panel clamps $f$ are provided for the purpose of securing the shield to the guide posts at or near the joint in the shield when the latter is in its extended position, so as to brace the shield against wind pressure. One of these clamping devices is illustrated in Figs. 3, 4 and 5, in which 17 indicates a metal corner piece, which forms also one leaf of the hinge 9 and is secured by suitable means, such as the bolts 18, to the side bar 10ª of the lower panel. A curved jaw 19 projects laterally from the corner piece and is adapted to bear against the forward side of the rod *b*. A movable jaw 20 is adapted to engage the rear side of the rod. This jaw is secured to a stud 21 which passes through suitable openings in the part 17 and is journaled therein. A handle 22 is secured to the forward end of the stud and a spring 23 surrounds the stud within the hollow corner piece and bears against a sleeve 24 on the handle. The spring thereby normally presses the jaw 20 toward the jaw 19 so as to grip the rod *b*. The handle 22 is arranged at right angles to the jaw 20 and normally hangs downward, as shown, so that the weight of the handle prevents the jaw from turning. When it is desired to fold the shield the handle is turned so as to move the jaw 20 out of engagement with the guide rod, and when the shield is extended the jaw is moved into engagement with the rod by turning the handle, as will be obvious.

In order to brace the guide rods against wind pressure brace rods *g* are secured to the tops of the rods by suitable bolts 25, and these rods extend downwardly and forwardly to a fixed part of the machine, where they are detachably secured. In the drawing the lower ends of the rods are connected to bolts which pass through the vehicle frame and through lugs which support the radiator, suitable wing-nuts 26 being provided upon the bolts so that the rods may be easily detached therefrom. When it is desired to remove the radiator to obtain better access to the engine the brace rods may be disconnected from the vehicle frame and swung to one side, turning pivotally about the bolts 25. After loosening the brace rods the entire shield and connected parts may, if desired, be removed by lifting the guide rods *b* out of the brackets *a*. It will be noted that the lower end portions 5 of the guide rods, when in the brackets, serve as handles for convenience in getting in and out of the vehicle.

What I claim is,—

1. A wind shield arranged for connection to vehicles comprising a lower panel hinged to suitable supporting means and adapted to swing forwardly, an upper panel hinged to the top of the lower panel and adapted to swing backwardly with reference to the lower panel, guide rods at the ends of the panels, and means for adjustably securing said panels to the rods.

2. A wind shield arranged for connection to vehicles comprising a lower panel hinged to suitable supporting means and adapted to swing forwardly, an upper panel hinged to the top of the lower panel and adapted to swing backwardly with reference to the lower panel, guide rods at the ends of the panels, devices adjustable vertically on said rods and pivotal connections between said devices and the ends of the upper panel.

3. A wind shield arranged for connection to vehicles comprising a lower panel hinged to suitable supporting means and adapted to swing forwardly, an upper panel hinged to the top of the lower panel and adapted to swing backwardly with reference to the lower panel, guide rods at the ends of the panels, clamps adjustable vertically on said rods and pivotal connections between said clamps and the ends of the upper panel.

4. A wind shield arranged for connection to vehicles comprising a suitable sill or base, a lower panel hinged to said base and adapted to swing forwardly, an upper panel hinged to the lower panel and adapted to swing backwardly with reference to the lower panel, guide rods at the ends of said panels, vertically adjustable clamping devices on said rods, and pivotal connections between the ends of said upper panel and said devices.

5. A wind shield arranged for connection to vehicles comprising guide rods, a sill or base connecting the lower end portions of said rods, a lower panel hinged to said sill and adapted to swing forwardly, an upper panel hinged to the lower panel and adapted to swing backwardly with reference to the lower panel, devices adjustable vertically on the rods and pivotal connections between said devices and the ends of the upper panel.

6. A wind shield arranged for connection to vehicles comprising guide rods, a lower panel hinged to suitable supporting means and adapted to swing forwardly, an upper panel hinged to the lower panel and adapted to swing backwardly with reference to the lower panel, means for locking said panels to the rods at or near the joint between said panels, devices adjustable vertically on the rods and pivotal connections between said devices and the ends of the upper panel.

7. A wind shield arranged for connection to vehicles comprising guide rods, a lower panel hinged to suitable supporting means and adapted to swing forwardly, an upper panel hinged to the lower panel and adapted to swing backwardly with reference to the lower panel, clamps or locking devices on the ends of the lower panel for locking the latter to the rods, devices adjustable vertically on the rods and pivotal connections between said devices and the ends of the upper panel.

8. A wind shield arranged for connection to vehicles comprising guide rods, a lower panel hinged to suitable supporting means and adapted to swing forwardly, an upper panel hinged to the lower panel and adapted to swing backwardly with reference to the lower panel, clamps or locking devices on the ends of the lower panel for locking the latter to the rods, clamps adjustable vertically on the rods, and pivotal connections between said latter clamps and the ends of the upper panel.

9. In a wind shield for vehicles, a pair of guide rods, a lower panel hinged to the vehicle and adapted to swing forwardly, an upper panel hinged to the lower panel and adapted to swing backwardly with reference to the lower panel, split clamping sleeves on said rods, fittings, having threaded sockets, at the ends of the upper panel, and clamping screws extending through openings in the sleeves and into said sockets.

10. In a wind shield for vehicles, a pair of guide rods, a lower panel hinged to suitable supporting means and adapted to swing forwardly, an upper panel hinged to the lower panel and adapted to swing backwardly with reference to the lower panel, vertically adjustable pivotal connections between the ends of the upper panel and the rods, and means for locking the lower panel to the rods comprising jaws fixed to the ends of the lower panel and adapted to bear against the forward sides of the rods, and spring jaws pivotally mounted on the rear side of said lower panel and adapted to engage the rear sides of the rods.

11. In a wind shield for vehicles, a pair of guide rods, a lower panel hinged to suitable supporting means and adapted to swing forwardly, an upper panel hinged to the lower panel and adapted to swing backwardly with reference to the lower panel, vertically adjustable pivotal connections between the ends of the upper panel and the rods, and means for locking the lower panel to the rods comprising jaws fixed to the ends of the lower panel and adapted to bear against the forward sides of the rods, spring jaws pivotally mounted on studs passing through the panel frame and adapted to engage the rear sides of the rods, and handles for turning said spring jaws, said handles being secured to the studs and extending at angles to the spring jaws.

12. A wind shield arranged for connection to motor vehicles comprising a lower panel hinged to a suitable support, an upper panel hinged to the lower panel, upright guide rods at the ends of the panels and connections between said guide rods and intermediate points of the ends of the upper panel, said connections being adapted to slide on the guide rods and pivotally support the upper panel, for the purpose set forth.

13. A wind shield arranged for connection to motor vehicles comprising a lower panel hinged to a suitable support, an upper panel hinged to the lower panel, upright guide rods at the ends of the panels, connections between said guide rods and intermediate points of the ends of the upper panel, said connections comprising clamps slidably mounted on the guide rods, and pivots carried by said clamps for pivotally supporting the upper panel.

14. A wind shield arranged for connection to motor vehicles comprising a lower panel hinged to a suitable support, an upper panel hinged to the lower panel, upright guide rods at the ends of the panels, connections between said guide rods and intermediate points of the ends of the upper panel, said connections including pivotal support for the upper panel, clamps slidably mounted on the guide rods and carrying said pivotal supports, and means for tightening said clamps and securing the upper panel thereto in any desired position.

15. A wind shield arranged for connection to motor vehicles comprising a lower panel hinged at its lower end to a suitable support, an upper panel pivotally connected to the lower panel, vertically adjustable supports pivotally connected to intermediate portions of the ends of the upper panel, and means for sustaining said supports in any desired adjustment.

16. A wind shield arranged for connection to motor vehicles comprising a lower panel, an upper panel suitably hinged to the lower panel, and vertically adjustable pivotal supports connected to intermediate portions of the ends of one of said panels, whereby said panels may be adjusted into the same plane, or into parallel planes, or to different angles with respect to each other.

17. A wind shield arranged for connection to motor vehicles comprising a support, a device adjustable relative thereto, two panels, a hinge connecting said panels, a pivot connecting one panel with the support and a pivot connecting the other panel with said device, said pivots being arranged at unequal distances from said hinge.

18. A wind shield arranged for connection to motor vehicles comprising a support, a device adjustable relative thereto, two panels, a hinge connecting said panels, a pivot connecting one panel with the support and a pivot connecting the other panel with said device, said former pivot being arranged farther from said hinge than said latter pivot.

19. A wind shield arranged for connection to motor vehicles comprising a support, a lower panel hinged thereto, an upper panel hinged to the lower panel, guide rods at the ends of the panels, a device adjustable longitudinally of said rods and pivoted to the ends of said upper panel at points nearer the hinge between the panels than is the lower hinge.

20. A wind shield arranged for connection to vehicles comprising a lower panel hinged to suitable supporting means, an upper panel approximately the same height as the lower panel and hinged thereto, guides, and devices having adjustable sliding connection with said guides and pivoted to the ends of the upper panel below the upper edge thereof.

21. A wind shield for vehicles comprising a support, a lower panel pivoted thereto, an upper panel pivoted to said lower panel and adapted to fold against said lower panel, and means for guiding said upper panel and having pivotal connection therewith so that the swinging of said upper panel in either direction will cause a to and fro movement of said lower panel about its pivot.

22. A wind shield for vehicles comprising a support, a lower panel pivoted thereto, an upper panel pivoted to said lower panel and adapted to fold against the lower panel, and sliding means for guiding said upper panel and having pivotal connection therewith so that the swinging of said upper panel in either direction will cause a to and fro movement of said lower panel about its pivot.

23. A wind shield for vehicles comprising a support and guide, a lower panel pivoted to said support, an upper panel pivoted to said lower panel, guiding means for said panels, having a pivotal connection with said upper panel and adjustable sliding connection with said guide, constructed so that the swinging of said upper panel will cause a to and fro swinging movement of said lower panel about its pivot.

24. A vehicle wind shield comprising upper and lower panels hinged together, pivotal means for connecting the lower panel with a support, and a device adapted for connection with the vehicle and having means connecting it with the upper panel between its hinge and its free edge, whereby the swinging of the upper panel in either direction will cause a to and fro swinging movement of the lower panel.

25. A vehicle wind-shield comprising upper and lower panels hinged together, pivotal means for connecting the lower panel with a support, and devices having pivotal connection with the opposite ends of the windshield and adapted to be connected with the vehicle, whereby the swinging of the upper panel in either direction will cause a to and fro swinging movement of the lower panel.

In testimony whereof I affix my signature in presence of two witnesses.

ALLEN LOOMIS.

Witnesses:
MILTON TIBBETTS,
CLARA DALE.

---

Copies of this patent may be obtained for five cents each, by addressing the "Commissioner of Patents, Washington, D. C."